United States Patent
Lee

(10) Patent No.: US 11,922,057 B2
(45) Date of Patent: Mar. 5, 2024

(54) COMPUTING SYSTEM INCLUDING HOST AND STORAGE SYSTEM WITH PRELOAD BUFFER MEMORY AND METHOD OF OPERATING THE SAME

(71) Applicant: SAMSUNG ELECTRONICS CO., LTD., Suwon-si (KR)

(72) Inventor: Chonyong Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 17/490,499

(22) Filed: Sep. 30, 2021

(65) Prior Publication Data

US 2022/0137875 A1 May 5, 2022

(30) Foreign Application Priority Data

Oct. 29, 2020 (KR) .................. 10-2020-0142527

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 3/061; G06F 3/0659
See application file for complete search history.

(56) References Cited

U.S. PATENT DOCUMENTS

| | | | | |
|---|---|---|---|---|
| 3,173,000 | A * | 3/1965 | Johnson | G06K 7/016 250/557 |
| 3,616,993 | A * | 11/1971 | McGuire | G05B 19/238 234/17 |
| 5,410,666 | A * | 4/1995 | Nakano | G06F 3/0601 711/114 |
| 6,996,694 | B1 * | 2/2006 | Muthukkaruppan | G06F 12/023 711/170 |
| 7,421,446 | B1 * | 9/2008 | Bruso | G06F 16/284 707/999.102 |
| 8,495,111 | B1 * | 7/2013 | Wang | G06F 3/0644 707/823 |
| 9,396,251 | B1 | 7/2016 | Boudreau et al. | |
| 10,430,378 | B1 * | 10/2019 | Harter | G06F 11/1484 |
| 10,489,354 | B2 | 11/2019 | Edwards et al. | |
| 10,656,865 | B1 | 5/2020 | Janse van Rensburg et al. | |

(Continued)

FOREIGN PATENT DOCUMENTS

KR 10-1579941 B1 12/2015

OTHER PUBLICATIONS

Z. Jiang and L. Kleinrock, "An adaptive network prefetch scheme," in IEEE Journal on Selected Areas in Communications, vol. 16, No. 3, pp. 358-368, Apr. 1998, doi: 10.1109/49.669044. (Year: 1998).*

*Primary Examiner* — Ramon A. Mercado
(74) *Attorney, Agent, or Firm* — Sughrue Mion, PLLC

(57) ABSTRACT

A storage system may include a storage device configured to store data in a storage area corresponding to a physical address; a buffer memory configured to temporarily store data read from the storage device; and a storage controller configured to store first data having a first priority and second data having a second priority received by the storage system in the storage device, and load the first data into the buffer memory.

20 Claims, 12 Drawing Sheets

| IMAGE LAYER | LAYER ID | UPPER LAYER | PRIORITY OF LAYER | SIZE | IMAGE ID | PRIORITY OF FILE |
|---|---|---|---|---|---|---|
| Layer 3 | L_ID 3 | Layer 2 | 3 | L3 | | |
| Layer 2 | L_ID 2 | Layer 1 | 2 | L2 | L_ID 1 | 1 |
| Layer 1 | L_ID 1 | — | 1 | L1 | | |

(56) References Cited

U.S. PATENT DOCUMENTS

| | | | |
|---|---|---|---|
| 11,567,704 B2* | 1/2023 | Bono | G06F 3/0659 |
| 2004/0205093 A1* | 10/2004 | Li | G06F 16/40 |
| 2006/0072400 A1* | 4/2006 | Anderson | G06F 16/10 |
| | | | 369/47.1 |
| 2011/0055261 A1* | 3/2011 | Makkar | H04L 67/1097 |
| | | | 707/E17.008 |
| 2011/0055297 A1* | 3/2011 | Maeda | G06F 3/0643 |
| | | | 707/824 |
| 2012/0023092 A1* | 1/2012 | Egan | G06F 16/24542 |
| | | | 707/718 |
| 2013/0014254 A1* | 1/2013 | Gladwin | G06F 11/1084 |
| | | | 726/22 |
| 2014/0101389 A1* | 4/2014 | Nellans | G06F 12/0862 |
| | | | 711/137 |
| 2014/0310473 A1* | 10/2014 | Bilas | G06F 11/1435 |
| | | | 711/129 |
| 2017/0177877 A1* | 6/2017 | Suarez | G06F 16/2455 |
| 2018/0137174 A1* | 5/2018 | Cahana | G06F 9/455 |
| 2018/0159951 A1* | 6/2018 | Bender | H04L 47/2433 |
| 2019/0243681 A1* | 8/2019 | Chen | G06F 16/24573 |
| 2019/0266259 A1 | 8/2019 | Chen | |
| 2020/0097412 A1* | 3/2020 | Chakra | G06F 12/0862 |
| 2020/0159747 A1 | 5/2020 | Lindberg Baccarin Arnaut et al. | |
| 2020/0192693 A1* | 6/2020 | Kawase | G06F 9/45558 |
| 2021/0349820 A1* | 11/2021 | Kutch | G06F 3/0604 |
| 2022/0137875 A1* | 5/2022 | Lee | G06F 3/0656 |
| | | | 711/154 |
| 2022/0350543 A1* | 11/2022 | Bono | G06F 3/061 |
| 2022/0350544 A1* | 11/2022 | Bono | G06F 3/067 |

* cited by examiner

COMPUTING SYSTEM INCLUDING HOST AND STORAGE SYSTEM WITH PRELOAD BUFFER MEMORY AND METHOD OF OPERATING THE SAME

CROSS-REFERENCE TO THE RELATED APPLICATION

This application is based on and claims priority under 35 U.S.C. § 119 to Korean Patent Application No. 10-2020-0142527, filed on Oct. 29, 2020, in the Korean Intellectual Property Office, the disclosure of which is incorporated by reference herein in its entirety.

BACKGROUND

Example embodiments of the present disclosure relate to a computing system, and more particularly, to a computing system including a host processing an image file and a storage system.

Recently, as a method for virtualizing server resources, virtual machine-based virtualization as well as container-based virtualization are being utilized. A container is a virtual space that shares a kernel of a host operating system, and does not require a guest operating system, and accordingly, the server resources may be virtualized faster than virtual machine-based virtualization.

On the other hand, when an error occurs in the container, virtualization resources may be insufficient depending on the usage of the application. In this case, the host may handle the error by creating a new container. However, when creating a new container, the time to read the image file for creating the container from the local storage in the server may have a substantial impact on the performance of handling container errors.

SUMMARY

Example embodiments provide a computing system for processing an image file, and a computing system that generates metadata for an image file and performs a write operation and a read operation of an image file based on the metadata.

According to an aspect of an example embodiment, there is provided a storage system including a storage device configured to store data in a storage area corresponding to a physical address; a buffer memory configured to temporarily store data read from the storage device; and a storage controller configured to store first data having a first priority and second data having a second priority received by the storage system in the storage device, and load the first data into the buffer memory.

According to an aspect of an example embodiment, there is provided a method of operating a computing system including obtaining, by the host, a first image file from an external registry; creating, by the host, a container by executing the first image file; providing, by the host, the first image file and metadata including an identifier indicating that the first image file is an image file to the storage system; and storing, by the storage system, the first image file in a storage area corresponding to continuous physical addresses, based on the identifier.

According to an aspect of an example embodiment, there is provided a computing system including a host configured to generate a container by executing an image file obtained from an external registry, and output a request for storing the image file and metadata including an identifier of the image file; and a storage system configured to receive the request for storing the image file and the metadata, and store the image file in a sequential manner by allocating the image file to continuous physical addresses based on the identifier.

BRIEF DESCRIPTION OF THE DRAWINGS

The above and other aspects will be more apparent from the following description of example embodiments taken in conjunction with the accompanying drawings, in which.

DETAILED DESCRIPTION

Hereinafter, various embodiments will be described with reference to the accompanying drawings.

Figure 1:
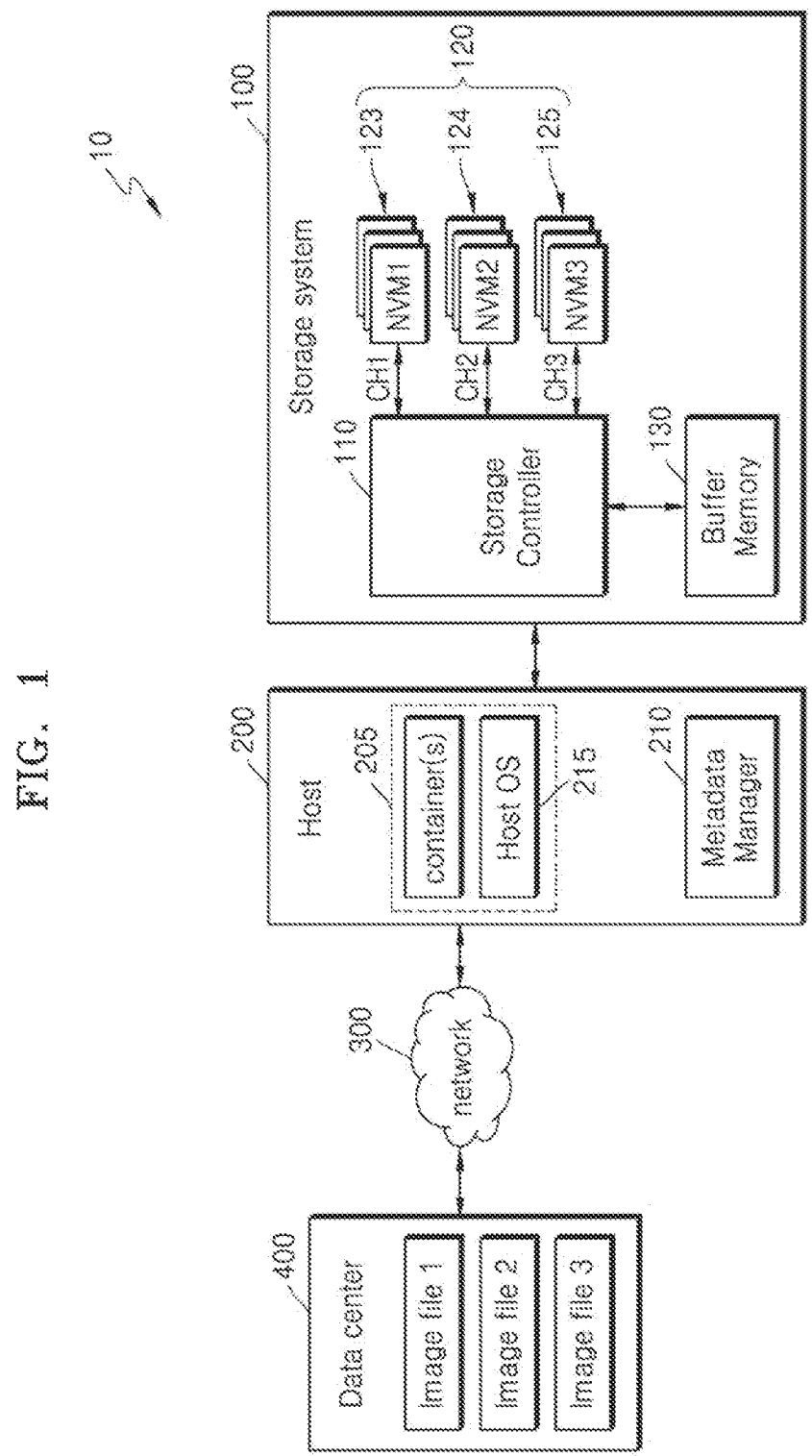
FIG. 1 is a diagram illustrating a computing system according to an example embodiment.

FIG. 1 is a diagram illustrating a computing system according to an example embodiment. Referring to FIG. 1, a computing system 10 may include a storage system 100, a host 200, a network 300, and a data center 400.

The storage system 100 may be a solid state drive (SSD), but embodiments are not limited thereto, and the storage system 100 may be implemented as a flash memory device, an embedded multimedia card (eMMC), a universal flash storage (UFS), or a redundant array of independent disks (RAID).

The storage system 100 may include a storage controller 110, a storage device 120, and a buffer memory 130. The storage device 120 may include a plurality of nonvolatile memories, for example, first, second, and third non-volatile memories 123, 124, and 125. For example, the nonvolatile memory may be magnetic RAM (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), a holographic memory, a molecular electronics memory, or an insulation resistance change memory.

The storage controller 110 may control the storage device 120 to read data stored in the storage device 120 or to write data to the storage device 120 in response to a read/write command received from the host 200. In detail, the storage controller 110 may control write, read, and erase operations on the storage device 120 by providing an address, a command, and a control signal to the storage device 120. In addition, data for a write operation and data for read data may be transmitted and received between the storage controller 110 and the storage device 120. The storage controller 110 may be connected to the storage device 120 through a plurality of channels CH1, CH2, and CH3. In detail, the storage controller 110 may be connected to the first, second, and third nonvolatile memories 123 to 125 through first to third channels CH1 to CH3, respectively. The storage controller 110 may provide addresses, commands, data, and control signals to the first, second, and third nonvolatile memories 123, 124, and 125 through the plurality of channels CH1, CH2, and CH3, and receive data from the first, second, and third nonvolatile memories 123, 124, and 125.

The buffer memory 130 may be a volatile memory. For example, the volatile memory may be dynamic random access memory (DRAM), synchronous dynamic RAM (SDRAM), and static random access memory (SRAM). The buffer memory 130 may temporarily store data to be output to the host 200 or data received from the host 200. Data stored in the buffer memory 130 may be provided to the host 200 faster than data stored in the storage device 120.

The host 200 may download an image file from the data center 400 through the network 300 and execute the image file to create a container 205. The container 205 may refer to an independent virtual system, and at least one application may be run on the container 205. Although only one container 205 is illustrated in FIG. 1, a plurality of containers may be created based on the same image file on one host operating system 215. That is, a plurality of containers may share the kernel of the host operating system 215. The image file may include a plurality of image layers associated with each other. The image layer may be read-only data used to create a container. Data that is changed by an operation performed in the container 205 may be written as a container layer. That is, the container layer may be writable data. The host 200 may change the container layer into an image layer through a commit command for the container layer. That is, through the commit command, the container layer may be included in the image file as read-only data.

The host 200 may provide the downloaded image file to the storage system 100. The storage system 100 may store an image file in the storage device 120. When an error occurs in the created container 205 or when it is necessary to create an additional container, the host 200 may create a normal container by receiving an image file from the storage system 100.

The host 200 may include a metadata manager 210. The metadata manager 210 may generate metadata of image files received from the data center 400. In one example, the metadata may include the priority of image files. The metadata manager 210 may determine the priority of a plurality of image layers included in one image file. In one example, the priority may be determined depending on the number of times the container 205 corresponding to the image file is created. That is, an image file corresponding to a container in which the number of generations is relatively frequent may have a relatively high priority. In another example, the priority of image layers included in the image file may be determined depending on the position of the layer in the image file. That is, a higher layer may have a higher priority. The host 200 may provide information on priority to the storage system 100. The storage system 100 may load a corresponding image file stored in the storage device 120 into the buffer memory 130 before receiving a read request from the host 200 for an image file having a relatively high priority.

The host 200 may provide an identifier indicating the image file to the storage system 100. The storage system 100 may sequentially store the image file in the storage device 120 by identifying the identifier. In one example, the storage system 100 may randomly store a file that does not include the identifier. When storing the file randomly, data may be stored in an area having discontinuous physical addresses, thereby providing low write and read performance. When storing the image files sequentially, data may be stored in an area having continuous physical addresses, and thus data may be written and read faster than the random method.

The storage system 100 according to an example embodiment may quickly provide a corresponding image file in response to a read request from the host 200 by storing data corresponding to the image file in an area having a continuous physical address.

The data center 400 may store a plurality of image files and provide a corresponding image file to the host 200 through the network 300 in response to a request of the host 200. The image file may also be referred to as a docker file. Referring to FIG. 1, one host 200 is illustrated, but an example embodiment is not limited thereto, and a plurality of hosts may access the data center 400 through the network 300. The data center 400 may be a public registry that does not restrict accessing hosts, or may be a local registry that may only access a predetermined host.

The network 300 may be a network fabric such as Fiber Channel, Ethernet, or InfiniBand. The network 300 may be connected to not only the data center 400 but also a plurality of file storages.

Figure 2:
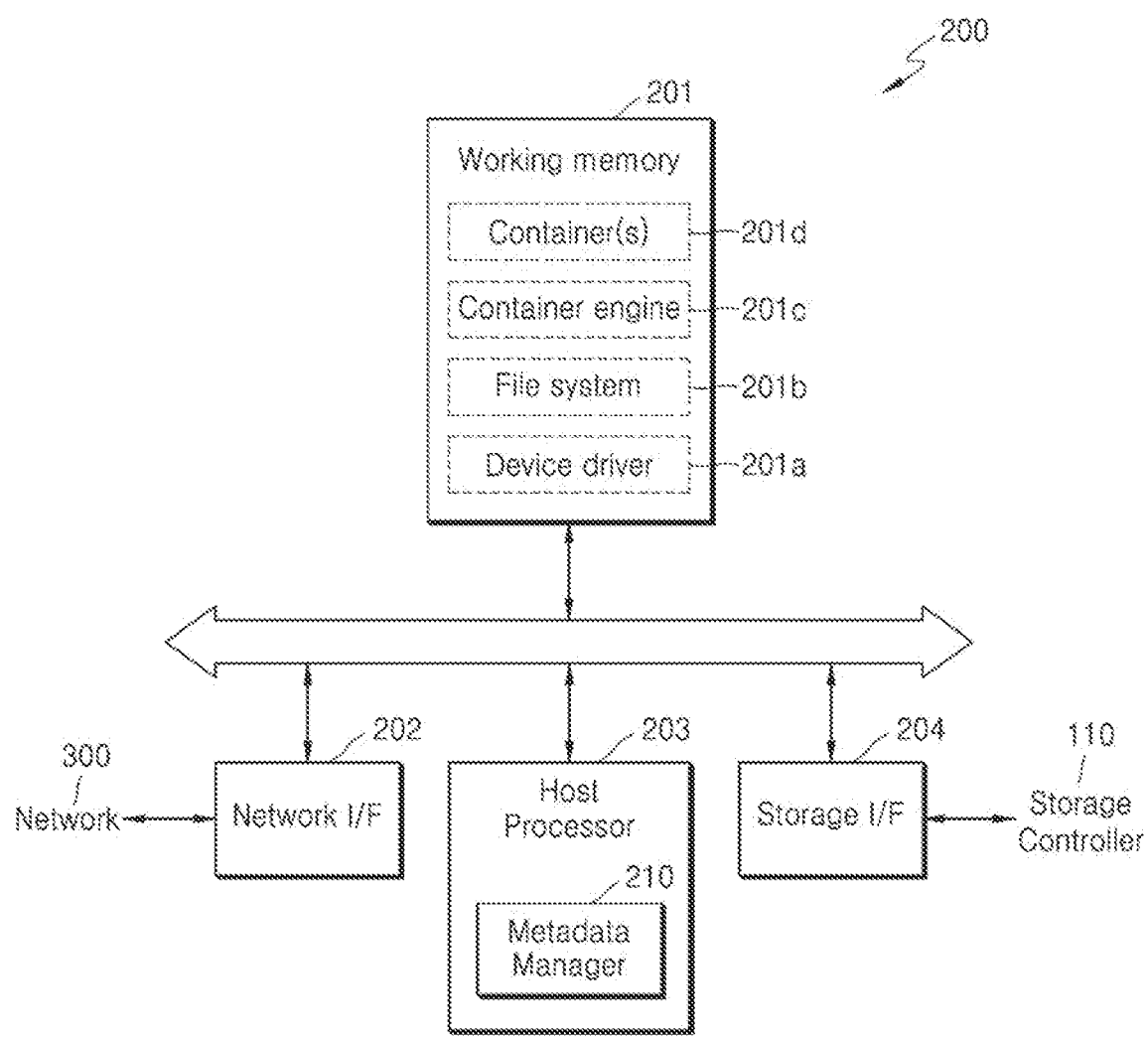
FIG. 2 is a diagram illustrating a host according to an example embodiment.

FIG. 2 is a diagram illustrating a host according to an example embodiment. Referring to FIG. 2, the host 200 may include a working memory 201, a network interface (I/F) 202, a host processor 203, and a storage interface 204.

The working memory 201 may be loaded with a device driver 201a, a file system 201b, a container engine 201c, and at least one container 201d. The at least one container 201d may be in a state in which an image file is executed. A plurality of containers may be created based on the same image file. The image file may be divided into a plurality of image layers related to each other. The image layer may be read-only data used to create a container. Data that is changed by an operation performed in the container may be recorded as a container layer. That is, the container layer may be writable data. The host processor 203 may change the container layer into an image layer through a commit command for the container layer. That is, through the commit command, the container layer may be included in the image file as read-only data. When the image file is executed again, a container reflecting the new image layer may be created. If the container is terminated before the host processor 203 issues a commit command, the container layer may be deleted. The container engine 201c may be a program that manages at least one container 201d. The container engine 201c may also be referred to as a docker engine. The software loaded in the working memory 201 is not limited thereto, and various types of software stacks for driving the host 200 may be loaded in the working memory 201.

The network interface 202 may receive an image file from the network 300. The network interface 202 may receive various types of files from a plurality of file storages including the data center 400. The network interface 202 may be referred to as a network interface card, a network interface controller, a local area network card, an Ethernet adapter, an Ethernet card, or the like.

The storage interface 204 may provide a physical connection between the host 200 and the storage system 100. That is, the storage interface 204 may provide various access requests issued by the host 200 to the storage system 100. The interfacing method of the storage interface 204 may be a universal serial bus (USB) interface, a small computer system interface (SCSI), a PCI express interface, an ATA interface, or a parallel ATA (PATA) interface, a serial ATA (SATA) interface, a serial attached SCSI (SAS), or an NVMe interface.

The host processor 203 may execute software, e.g., the device driver 201a, the file system 201b, the container engine 201c, and the at least one container 201d, to be executed by the host 200. In detail, the host processor 203 may execute an operating system (OS) loaded in the working memory 201, and may execute various software driven based on the operating system. The host processor 203 may be a homogeneous multi-core processor or a heterogeneous multi-core processor. The host processor 203 may load an image file received through the network interface 202 into the working memory 201. The host processor 203 may create the at least one container 201d by executing the image file. The number of containers is not limited. An application program may be run in an area separated by a container. The file system 201b and the device driver 201a may be included in a kernel of an operating system. A plurality of containers may share the kernel of the operating system.

The host processor 203 may include a metadata manager 210. The metadata manager 210 may generate metadata for an image file received through the network interface 202. The metadata of the image file will be described later through FIG. 3.

The host 200 according to an embodiment provides metadata for an image file to the storage controller 110, so that when it is necessary to create an additional container, the host 200 may quickly receive an image file from the storage controller 110 based on metadata. Thus, the speed of creating the container may be improved.

Figure 3:
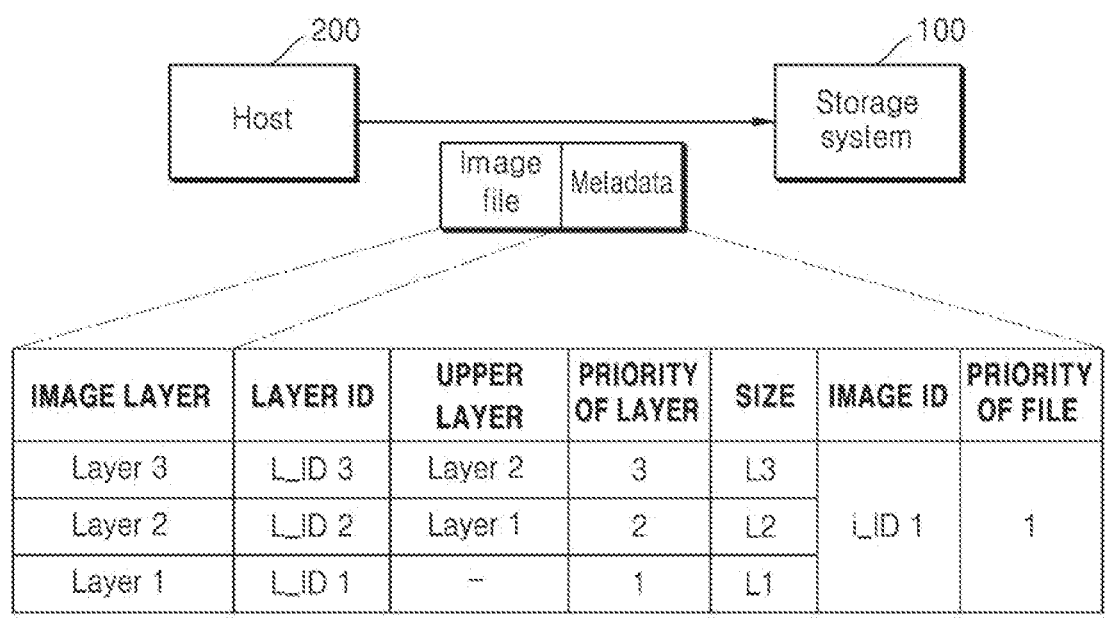
FIG. 3 is a diagram illustrating an image file and meta information according to an example embodiment.

FIG. 3 is a diagram illustrating an image file and meta information according to an example embodiment. Referring to FIG. 3, the host 200 may generate metadata corresponding to an image file and provide the image file and metadata to the storage system 100. The storage system 100 may store image files and metadata. The image file may consist of three image layers Layer 1, 2, and 3. The number of layers included in the image file is not limited thereto. The three image layers may be read-only.

The metadata manager 210 may generate metadata of the image file. The metadata may include a layer ID for identifying image layers included in the image file, upper layer information indicating association between layers, a priority of the layer, a size of the layer, an image ID to identify the image file, and a priority of the image file.

The storage system 100 may determine whether the received data is an image file by identifying the image ID. The storage system 100 stores or reads the image file in a sequential manner, thereby rapidly processing a write request and a read request of the image file repeatedly received from the host 200. The storage system 100 may determine a physical address allocated to the image file based on the size of the layer.

The storage system 100 may determine an image layer expected to be requested by the host 200 based on the upper layer information. For example, when receiving a read request for the second image layer Layer 2 from the host 200, the storage system 100 may predict that the host 200 will request to read the third image layer Layer 3 based on the upper layer information. Accordingly, the storage system 100 may preload the third image layer Layer 3 into the buffer memory 130 before the host 200 requests to read the third layer Layer 3.

The storage system 100 may determine data to be preloaded in the buffer memory 130 based on the priority of the image file or the priority of the image layer. The storage system 100 may quickly provide the image file or image layer requested by the host 200 to the host 200 by preloading the image file or image layer into the buffer memory 130.

Figure 7:
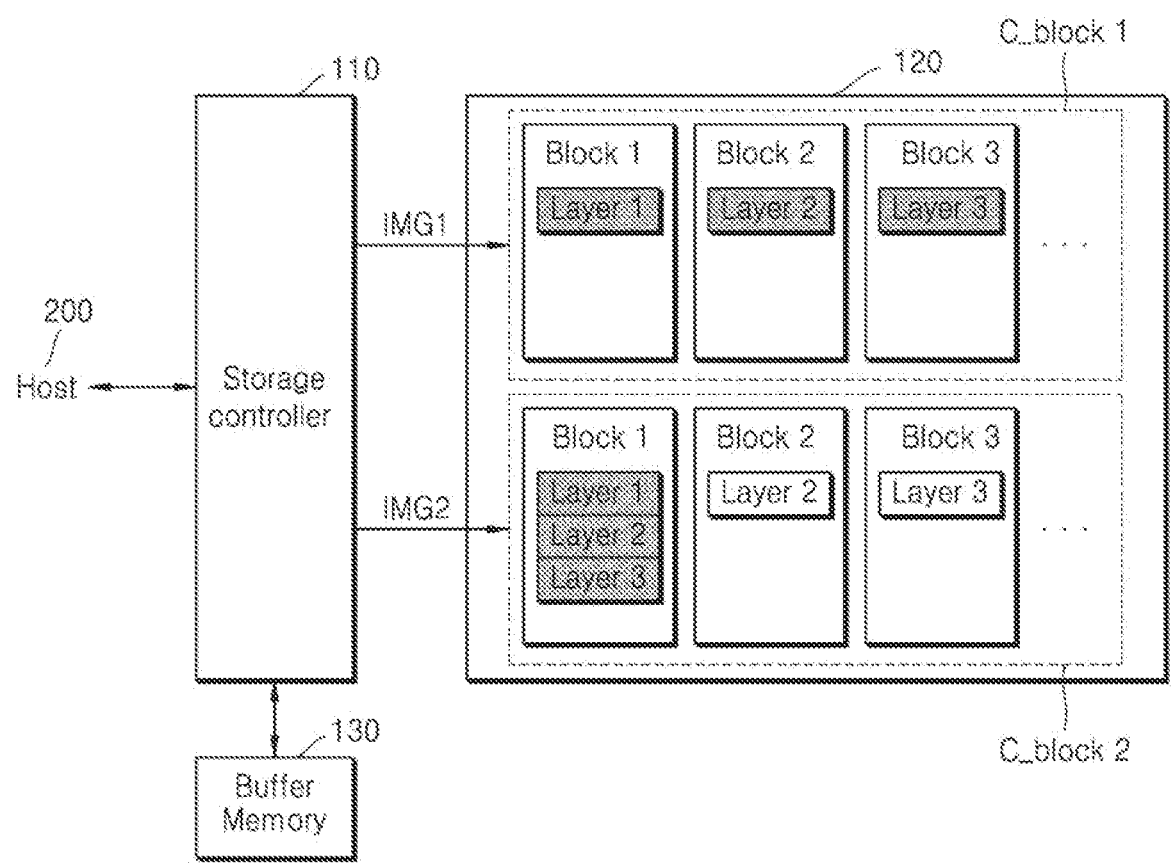
FIG. 7 is a diagram illustrating a method of storing an image file according to an example embodiment.

The storage system 100 may store image layers in the storage device 120 through different channels based on the layer ID. That is, image layers constituting one image file may be stored in one cluster block based on the layer ID. The cluster block may be a group of blocks connected to a plurality of channels, respectively. That is, a plurality of channels may be connected to a plurality of nonvolatile memories, respectively, and blocks included in the cluster block may be included in the plurality of nonvolatile memories, respectively. As shown in FIG. 7, the nonvolatile memory may include at least one block in which data is stored.

The host according to the example embodiment may improve the speed at which the image file is written to the storage system and the speed at which the image file is read from the storage system by providing meta information on the image file to the storage system.

Figure 4:
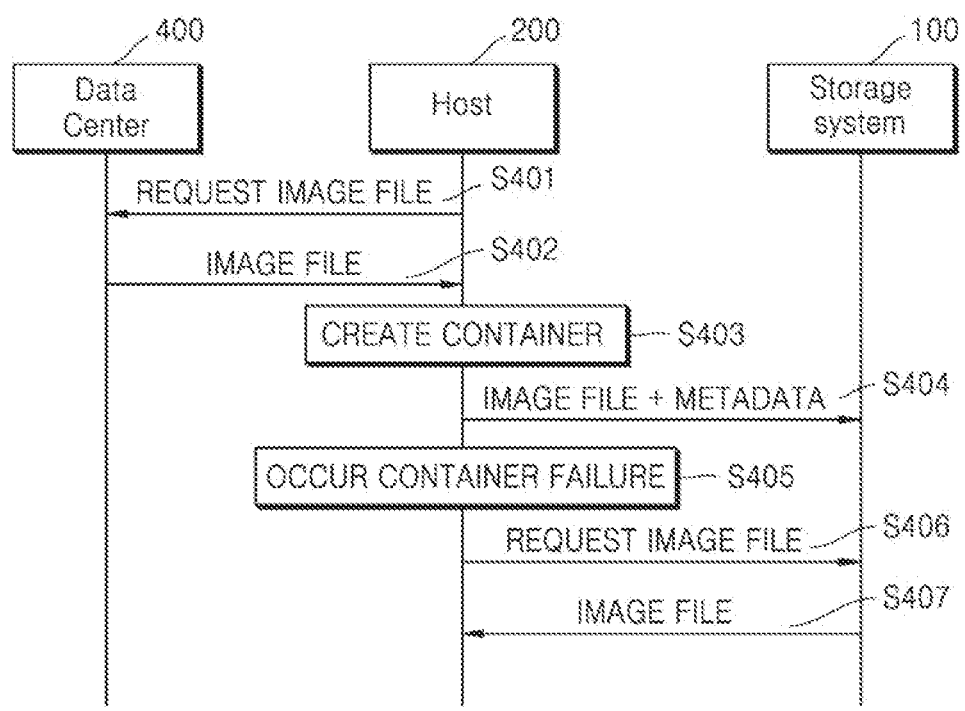
FIG. 4 is a diagram illustrating a method of operating a computing system according to an example embodiment.

FIG. 4 is a diagram illustrating a method of operating a computing system according to an example embodiment. Referring to FIG. 4, a method of operating a computing system may include a plurality of operations S401 to S407.

In operation S401, the host 200 may request an image file for container creation from the data center (image file registry) 400. For example, the host 200 may issue a command to request an image file. The host 200 may transmit a version of the requested image file to the data center 400, and the data center 400 may determine image layers to be transmitted to the host 200 by referring to the version of the requested image.

In operation S402, the data center 400 may provide the image file to the host 200. In operation S403, the host 200 may create a container by executing the image file.

In operation S404, the host 200 may generate metadata for the image file and provide the image file and the metadata to the storage system 100. Also, the host 200 may request the storage system 100 to write the image file and the metadata. The storage system 100 may store the image file with reference to the metadata. For example, the storage system 100 may sequentially store the image file by identifying the image ID. The storage system 100 may preload an image layer expected to be requested by the host 200 into the buffer memory 130 based on the upper layer information. The storage system 100 may preload the image file or the image layer into the buffer memory 130 based on the priority of the image file or the image layer. The storage system 100 may store image layers included in the image file in the storage device 120 in parallel through different channels based on the layer ID.

In operation S405, a failure may occur in a container running on the host 200. Accordingly, the host 200 may need an image file provided to the storage system 100 in order to recreate the container in which the failure occurred. Alternatively, the host 200 may need to additionally create the same container as the running container.

In operation S406, the host 200 may request the storage system 100 for an image file necessary for recreating the container. The host 200 may request all layers included in the image file, or may request some layers included in the image file.

In operation S407, the storage system 100 may provide the image file to the host 200. The storage system 100 may read an image file in a sequential read manner and provide the read image file to the host 200. The storage system 100 may omit an operation of reading an image file from the storage device 120 and provide the image file or image layer preloaded in the buffer memory 130 to the host 200.

Figure 5:
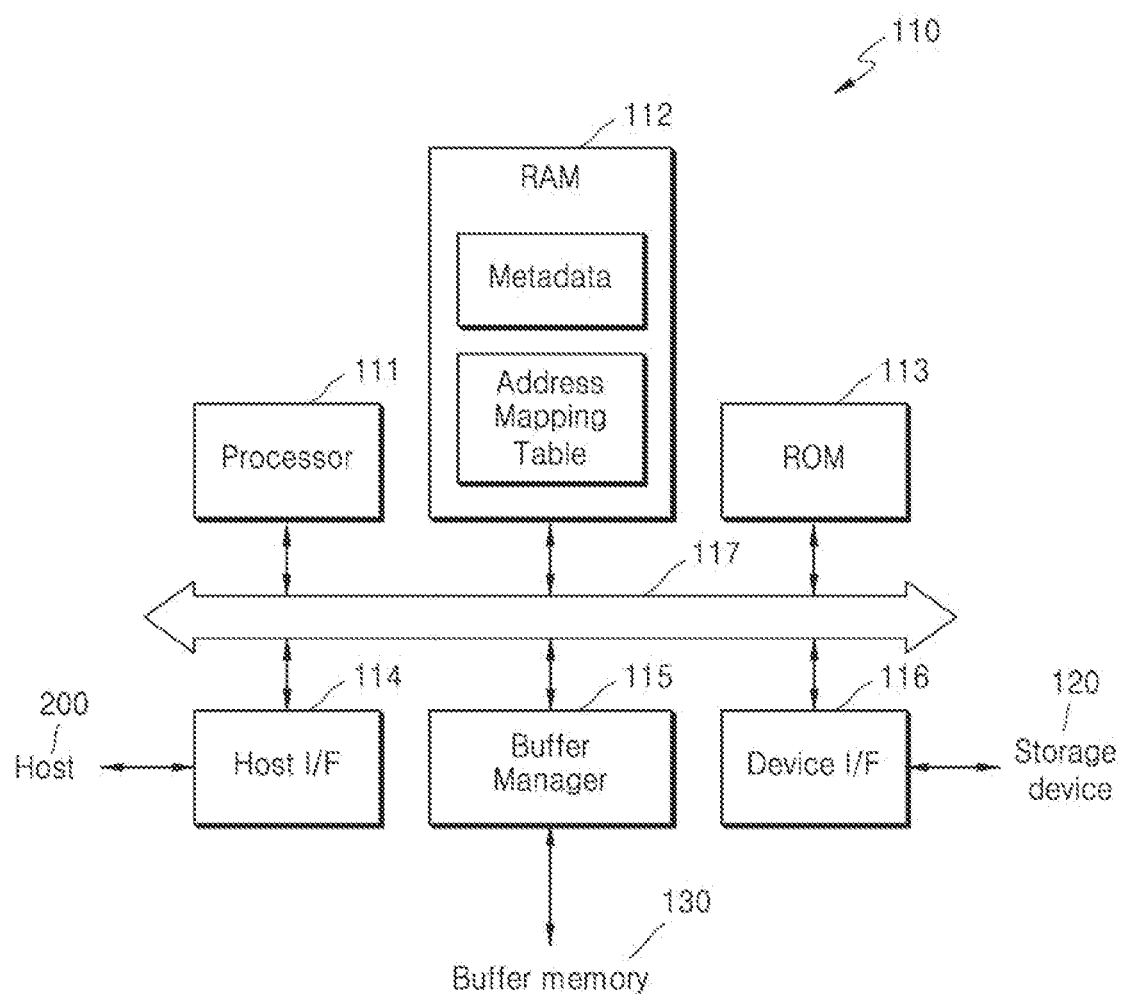
FIG. 5 is a block diagram illustrating a storage controller according to an example embodiment.

FIG. 5 is a block diagram illustrating a storage controller according to an example embodiment. Referring to FIG. 5, the storage controller 110 may include a processor 111, random access memory (RAM) 112, read-only memory (ROM) 113, a host interface 114, a buffer manager 115, and a device interface 116. The processor 111, the RAM 112, the ROM 113, the host interface 114, the buffer manager 115, and the device interface 116 may communicate with each other via a bus 117.

The processor 111 may include a central processing unit or a microprocessor, and may control the overall operation of the storage controller 110. The processor 111 may include one or more processor cores capable of executing an instruction set of program code configured to perform a certain operation. For example, the processor 111 may execute command code loaded in the RAM 112 or command code of firmware stored in the ROM 113.

The RAM 112 may operate under control of the processor 111 and be used as an operation memory, a buffer memory, a cache memory, or the like. For example, the RAM 112 may be implemented as a volatile memory such as DRAM or SRAM, or a non-volatile memory such as PRAM and flash memory. The RAM 112 may include an address mapping table and metadata. The address mapping table may include relationship information between a physical address and a logical address of an area in which data received from the host interface 114 is stored. The metadata may be an example of metadata described above with reference to FIG. 3. The processor 111 may control a write operation or a read operation of the image file by referring to the metadata loaded in the RAM 112.

The host interface 114 may provide an interface between the host 200 and the storage controller 110, for example, and may provide an interface based on universal serial bus (USB), MMC, PCI-E PCIExpress (PCIe), AT attachment (ATA), serial AT attachment (SATA), parallel AT attachment (PATA), small computer system interface (SCSI), serial attached SCSI (SAS), enhanced small disk interface (ESDI), integrated drive electronics (IDE), or the like.

The buffer manager 115 may provide an interface between the storage controller 110 and the buffer memory 130, and the device interface 116, and may provide an interface between the storage controller 110 and the storage device 120.

The processor 111 may allocate a logical address and a physical address to a file received from the host 200 and provide the physical address and the file to the storage device 120. The storage device 120 may store the file in a storage area corresponding to the physical address. When the image ID is included in the metadata received from the host 200, the processor 111 may control sequential write and read operations by determining the received file as an image file and allocating continuous physical addresses to the image file. When the image ID is not included in the metadata received from the host 200, the processor 111 may control random write and read operations by allocating a discontinuous physical address to the file data. In this case, the file may not be an image file. The processor 111 may control the buffer manager 115 so that an image layer expected to be requested by the host 200 is preloaded into the buffer memory 130 based on upper layer information included in the metadata. The processor 111 may control the buffer manager 115 to preload an image file or an image layer into the buffer memory based on the priority included in the metadata. The processor 111 may control image layers included in the image file to be stored in the storage device 120 in parallel through different channels based on the layer ID.

Figure 6:
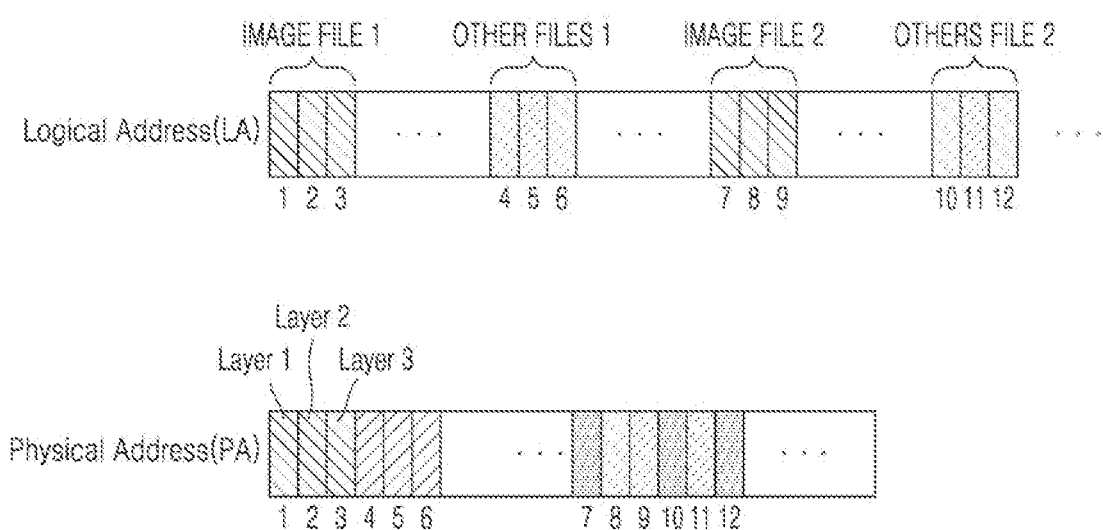
FIG. 6 is a diagram illustrating an example of address mapping of an image file according to an example embodiment.

FIG. 6 is a diagram illustrating an example of address mapping of an image file according to an example embodiment. Referring to FIG. 6, the storage controller 110 may allocate a logical address and a physical address to files received from the host 200. For example, the storage controller 110 may allocate logical addresses LA1 to LA3 and physical addresses PA1 to PA3 to the first image file. Logical addresses allocated to files received from the host 200 may be continuous. Therefore, regardless of the type of file, the storage controller 110 may allocate continuous logical addresses to files other than image files. For example, the storage controller 110 may allocate logical addresses LA4 to LA6 to the first other files.

The storage controller 110 may allocate a continuous physical address to a file identified through an image ID received from the host 200, that is, an image. For example, the storage controller 110 may allocate physical addresses PA1 to PA3 to one image file through the image ID. Also, the storage controller 110 may allocate continuous physical addresses to a plurality of layers included in the image file based on the layer ID. For example, the storage controller 110 may allocate the physical address PA1 to the first layer Layer 1, allocate the physical address PA2 to the second layer Layer 2, and allocate the physical address PA3 to the third layer Layer 3. When the image ID corresponding to the file received from the host 200 is not identified, the storage controller 110 may allocate a discontinuous physical address to the file. For example, the storage controller 110 may allocate physical addresses PA7, PA10, and PA 12 to the first other file.

The size of the storage area corresponding to one physical address may be determined in advance. For example, the size of a storage area corresponding to one physical address may be 4 KB. The storage controller 110 may determine a range of physical addresses continuously allocated to the image file based on a size of the image layer included in the metadata.

FIG. 7 is a diagram illustrating a method of storing an image file according to an example embodiment. Referring to FIG. 7, a storage controller 110 may store first and second image files IMG1 and IMG2 received from a host 200 in a storage device 120. The first image file IMG1 may be stored in a first cluster block C_block 1, and a second image file IMG2 may be stored in the second cluster block C_block 2. The cluster block may be a set of blocks each included in devices respectively connected to different channels. For example, first, second, and third blocks Block 1, 2, and 3 included in the first cluster block C_block 1 may be included in devices connected to different channels, respectively.

The storage controller 110 may control the storage device 120 so that a plurality of image layers Layer 1, 2, and 3 included in the first image file IMG1 are stored in parallel in a plurality of blocks included in one cluster block. In detail, the storage controller 110 may improve the speed at which the first image file IMG 1 is stored by providing the plurality of image layers Layer 1, 2, and 3 to the first, second, and third blocks Block 1, 2, and 3 in parallel through a plurality of channels. The storage controller 110 may manage an address mapping table so that blocks included in the cluster block correspond to continuous physical addresses.

The storage controller 110 may control the storage device 120 so that a plurality of image layers Layer 1, 2, and 3 included in the second image file IMG2 are stored in a single block. In detail, the storage controller 110 may provide image layers Layer 1, 2, and 3 to the storage device 120 through one channel so that the image layers Layer 1, 2, and 3 are stored in a storage area with continuous physical addresses in one block Block 1.

Figure 8A:
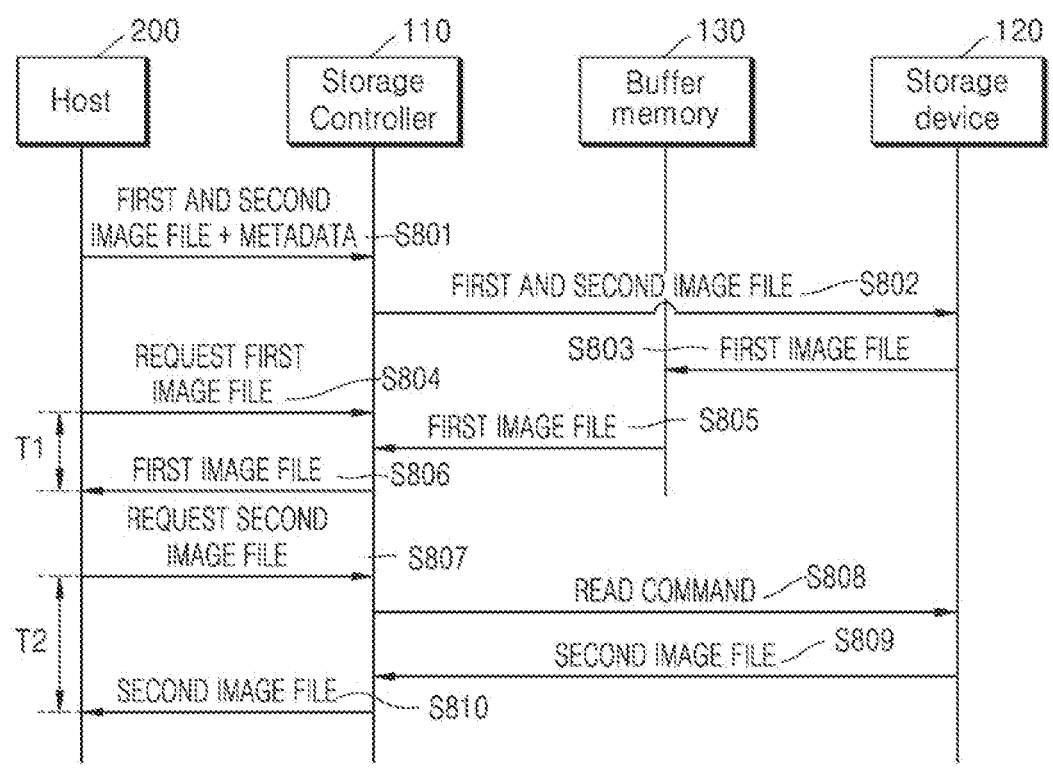
FIG. 8A is a diagram illustrating an example of a method of reading an image file according to an example embodiment.

FIG. 8A is a diagram illustrating an example of a method of reading an image file according to an example embodiment. Referring to FIG. 8A, the method of reading an image file may include a plurality of operations S801 to S810.

In operation S801, a host 200 may provide first and second image files and metadata of the first and second image files to a storage controller 110. The storage controller 110 may determine a write manner of the first and second image files as a sequential manner based on an image ID included in the metadata, and may allocate physical addresses to the first second image files according to the sequential manner. The storage controller 110 may determine a range of physical addresses allocated to the first and second image files based on a size of the image layer included in the metadata.

In operation S802, the storage controller 110 may provide the first and second image files to a storage device 120. The storage device 120 may store the first and second image files under control of the storage controller 110. The storage controller 110 may control a plurality of image layers included in one image file to be stored in the storage device 120 in parallel by outputting image layers having different layer IDs through each of a plurality of channels.

In operation S803, the first image file stored in the storage device 120 may be preloaded into a buffer memory 130. The storage controller 110 may control the storage device 120 such that an image file having a relatively high priority is preloaded into the buffer memory 130 based on the priority of the image file included in the metadata. The priority of the first image file may be higher than that of the second image file.

In operation S804, the host 200 may request the storage controller 110 for the first image file to create a container. In operation S805, the first image file may be transmitted from the buffer memory 130 to the storage controller 110. In operation S806, the storage controller 110 may provide the first image file to the host 200. As the storage controller 110 reads the first image file from the buffer memory 130 instead of the storage device 120, a speed of responding to the request of the host 200 may be improved. The time required to perform operations S804 to S806 may be T1.

In operation S807, the host 200 may request the second image file from the storage controller 110 to create another container. The second image file may not have been preloaded in the buffer memory 130 due to a relatively low priority. Accordingly, in operation S808, the storage controller 110 may transmit a read command for the second image file to the storage device 120. In operation S809, the storage device 120 may provide the second image file to the storage controller 110 in response to the read command. In operation S810, the storage controller 110 may provide the second image file to the host 200. The time required to perform operations S807 to S810 may be T2. Because time T2 includes a time when the second image file is read from the storage device, time T2 may be relatively longer than time T1.

According to the method of reading an image file according to an example embodiment, the storage controller loads a relatively high-priority image file into the buffer memory before the host's read request is received, and accordingly, the storage controller may quickly respond to the host's read request.

Figure 8B:
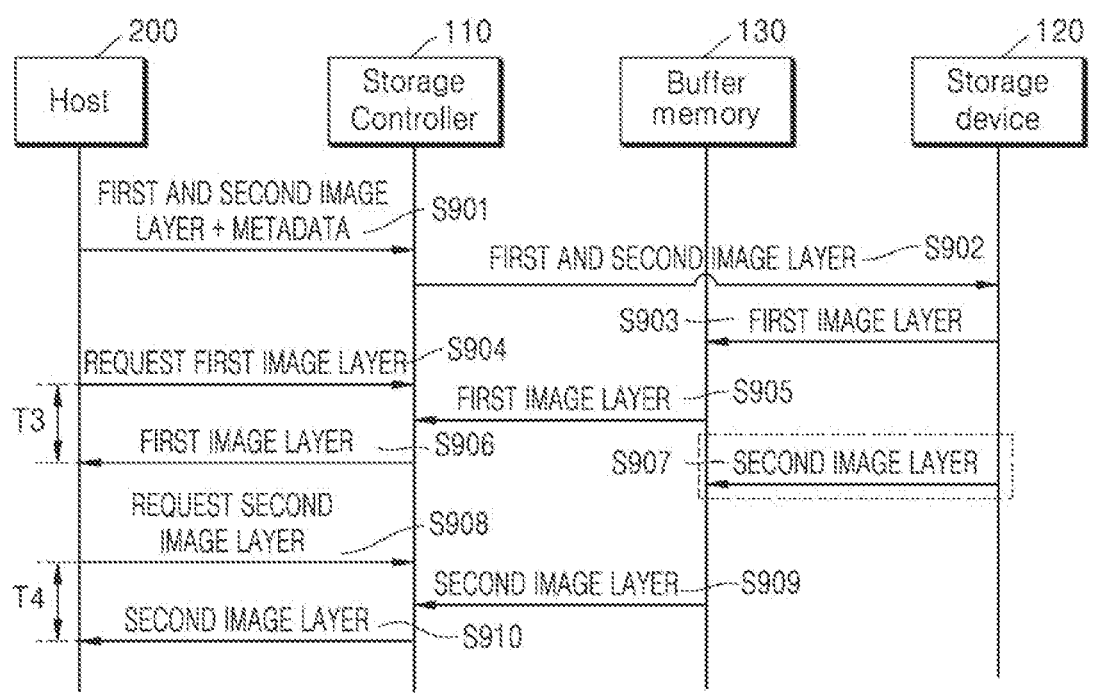
FIG. 8B is a diagram illustrating a method of reading an image layer according to an example embodiment.

FIG. 8B is a diagram illustrating a method of reading an image layer according to an example embodiment. Referring to FIG. 8B, a host 200 may request a storage controller 110 to read some of the image layers included in the image file. The method of reading the image layer may include a plurality of operations S901 to S910.

In operation S901, the host 200 may provide first and second image layers and metadata included in the first and second image files to the storage controller 110. The metadata may include upper layer information of each of the first and second image layers. For example, the first image layer may be an upper layer of the second image layer. The metadata may further include a layer ID and layer priority information.

In operation S902, the storage controller 110 may control the first and second image layers to be stored in a storage device 120 by providing the first and second image layers to the storage device 120. The storage controller 110 may control the first and second image layers to be stored in the storage device 120 in parallel by outputting the first and second image layers through different channels based on the layer ID.

In operation S903, the first image layer stored in the storage device 120 may be preloaded into a buffer memory 130. The priority of the first image layer may be higher than that of the second image layer.

In operation S904, the host 200 may request the storage controller 110 to read the first image layer. In operation S905, the first image layer preloaded in the buffer memory 130 may be provided to the storage controller 110. In operation S906, the storage controller 110 may provide the first image layer to the host 200. The time required to perform operations S904 to S906 may be T3.

In operation S907, the second image layer having the first image layer as an upper layer may be preloaded from the storage device 120 to the buffer memory 130. Although it is shown that operation S907 is performed after operation S906, embodiments are not limited thereto. In order to create a container, the host 200 may have a high probability of requesting to read not only the first image layer but also the second image layer. Accordingly, operation S907 of preloading the second image layer may be performed after operation S904 of requesting the host to read the first image layer.

In operation S908, the host 200 may request the storage controller 110 to read the second image layer. In operation S909, the second image layer preloaded in the buffer memory 130 may be provided to the storage controller 110. In operation S910, the storage controller 110 may provide the second image layer to the host 200. The time required to perform operations S908 to S910 may be T4. Because both of the first and second image layers are preloaded in the buffer memory 130 in advance of being requested by the host 200, time T3 and time T4 may be approximately the same.

According to a method of reading the image layer according to an example embodiment, the storage controller 110 may quickly respond to the request of the host 200 by preloading the image layer expected to be read by the host 200 based on the upper layer information into the buffer memory 130.

Figure 9:
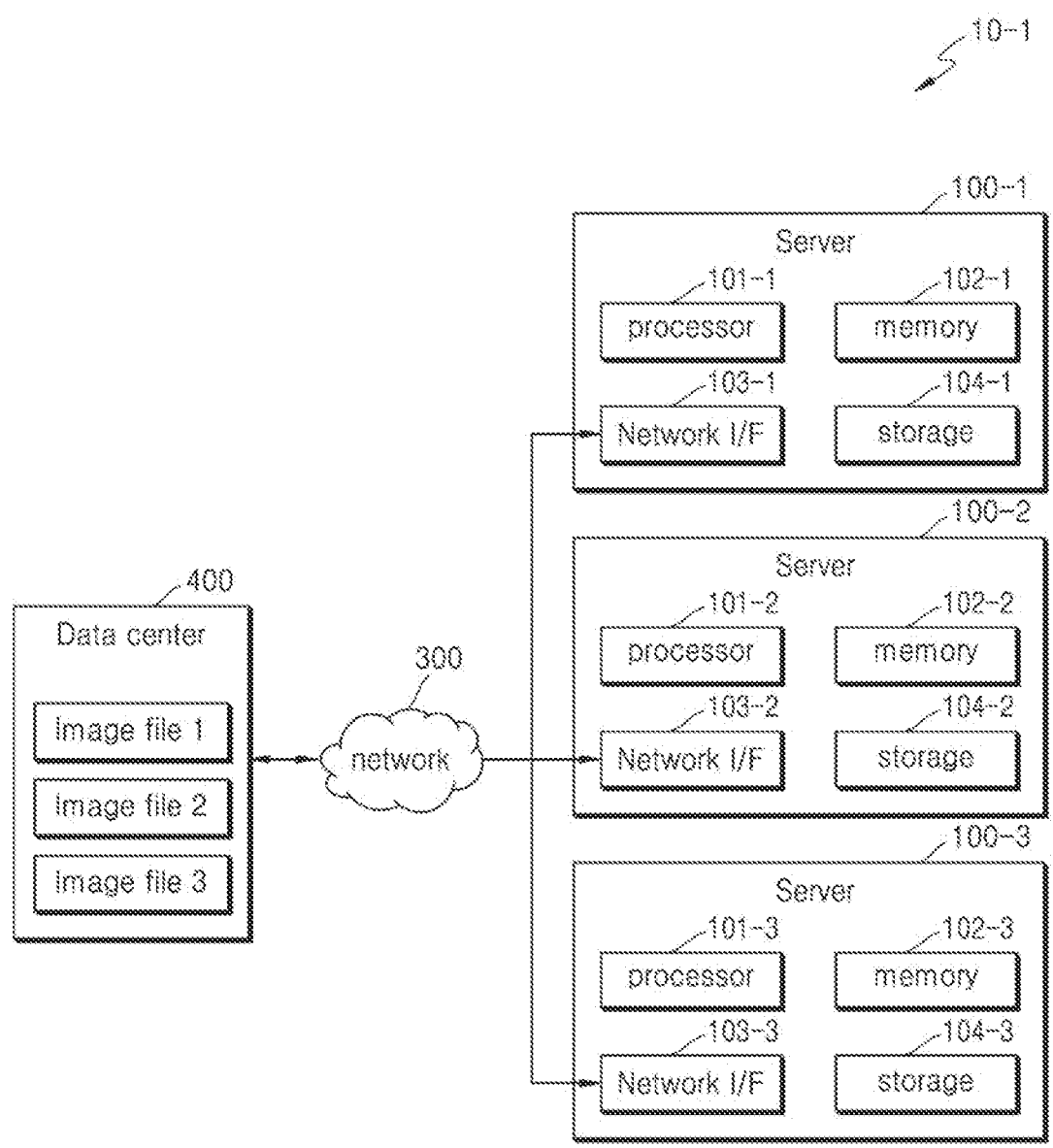
FIG. 9 is a diagram illustrating a computing system according to an example embodiment.

FIG. 9 is a diagram illustrating a computing system according to an example embodiment. Referring to FIG. 9, a computing system 10-1 may include a plurality of servers 100-1, 100-2 and 100-3, a network 300, and a data center 400. Each of the plurality of servers 100-1, 100-2 and 100-3 may be a device including the storage system 100 and the host 200 described above in FIG. 1. The plurality of servers 100-1, 100-2, and 100-3 may include the same components. That is, the plurality of servers 100-1, 100-2 and 100-3 may respectively include processors 101-1, 101-2, and 101-3, memories 102-1, 102-2, and 102-3, network interfaces 103-1, 103-2, and 103-3, and storages 104-1, 104-2, and 104-3. The host 200 of FIG. 1 may correspond to the processor 101-1, the memory 102-1, and the network interface 103-1 of FIG. 9. The storage system 100 of FIG. 1 may correspond to the storage 104-1 of FIG. 9.

The server 100-1 may include the processor 101-1, the memory 102-1, the storage 104-1, and the network interface 103-1. Herein, the processor 101-1 may be referred to as a host processor, the memory 102-1 may be referred to a working memory, and the storage 104-1 may be referred to as a storage system.

The network interface 103-1 may receive an image file from the network 300. The network 300 may be connected to not only the data center 400 but also a plurality of file storages. Accordingly, the network interface 103-1 may receive various types of files from the plurality of file storages. The network interface 103-1 may be a network interface card, a network interface controller, a local area network card, an Ethernet adapter, an Ethernet card, or the like.

The processor 101-1 may generate metadata corresponding to an image file among files received through the network interface 103-1 and store the image file and the metadata in the storage 104-1. The processor 101-1 may correspond to the host processor 203 of FIG. 2.

The memory 102-1 may load software and image files executed by the processor 101-1. The software and image files may be received through the network interface 103-1 or loaded from the storage device 104-1 into the memory 102-1. The memory 102-1 may correspond to the working memory 201 of FIG. 2.

The storage 104-1 may store image files received through the network interface 103-1 or data generated by the processor 101-1. The storage 104-1 may correspond to the storage system 100 of FIG. 1.

Figure 10:
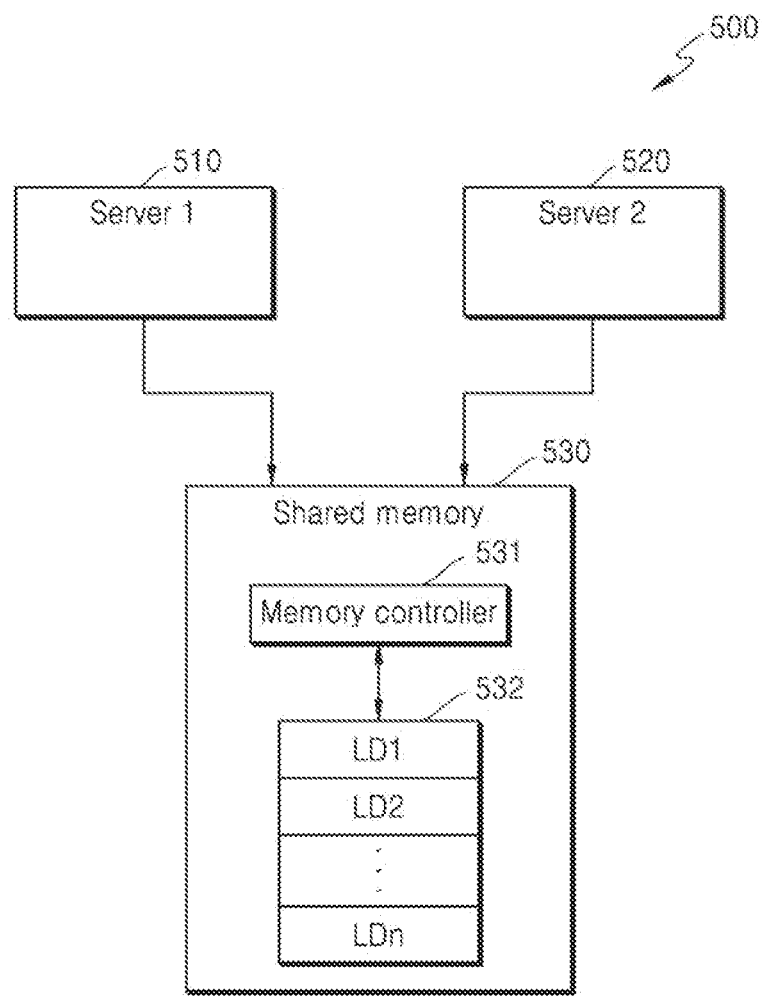
FIG. 10 is a diagram illustrating a system according to an example embodiment.

FIG. 10 is a diagram illustrating a system according to an example embodiment. Referring to FIG. 10, a system 500 may include a plurality of servers 510 and 520 and a shared memory 530. The plurality of servers 510 and 520 may request data access to the shared memory 530. Accordingly, the plurality of servers 510 and 520 may be referred to as host devices.

Each of the plurality of servers 510 and 520 may be an example implementation of the server 100-1 described above with reference to FIG. 9. Although the system 500 is described as including two servers, embodiments are not limited thereto, and various numbers of servers may be included in the system 500.

The shared memory 530 may include various types of memories. For example, the shared memory 530 may include a nonvolatile memory such as SSD, flash memory, MRAM, FRAM, PRAM, resistive RAM (RRAM), and the like. Alternatively, the shared memory 530 may be DRAM such as SDRAM, low power double data rate (LPDDR) SDRAM, graphics double data rate (GDDR), SDRAM, Rambus dynamic random access memory (RDRAM), and the like.

Devices included in system 500 may communicate with each other through an interconnect (or link) that supports one or more protocols. Each of the devices may include internal components that perform communication based on a protocol supported through the interconnect. For example, at least one protocol selected from among technologies such as a PCIe protocol, a compute express link (CXL) protocol, an XBus protocol, an NVLink protocol, an Infinity Fabric protocol, a cache coherent interconnect for accelerators (CCIX) protocol, a coherent accelerator processor interface (CAPI) protocol, and the like may be applied to the interconnect.

The shared memory 530 may be shared by the plurality of servers 510 and 520 including a first server 510 and a second server 520. The shared memory 530 may also be referred to as a pooled memory. The shared memory 530 may store instructions executed by the first server 510 and the second server 520, or store data input for an operation process and/or a result of the operation process. The shared memory 530 may include a memory controller 531 and a memory device 532.

The memory controller 531 may control a delivery path for data stored in the memory device 532 and data read from the memory device 532. The memory controller 531 may allocate a memory area included in the memory device 532 to the first and second servers 510 and 520.

The memory device 532 may include a plurality of memory areas, and the memory areas may be allocated to different servers. For example, the memory areas may correspond to logical devices that are logically divided, and one physical shared memory 530 may be recognized as a plurality of devices (e.g., a plurality of memory devices) in the system 500. The memory device 532 may include first to n-th memory areas LD1 to LDn. In the embodiment shown in FIG. 10, the first memory area LD1 may be allocated to the first server 510, and the n-th memory area LDn may be allocated to the second server 520. The first and n-th memory areas LD1 and LDn may be independently accessed by the first server 510 and the server 520, respectively. In an example, the memory area allocated to the server may operate as a part of the working memory shown in FIG. 2. Accordingly, some of the software loaded in the working memory may be loaded on the memory area of the memory device 532. In another example, the memory area allocated to the server may operate as part of the storage system illustrated in FIG. 1. Accordingly, a part of the image file or metadata stored in the storage system may be stored in a memory area of the memory device 532.

Figure 11:
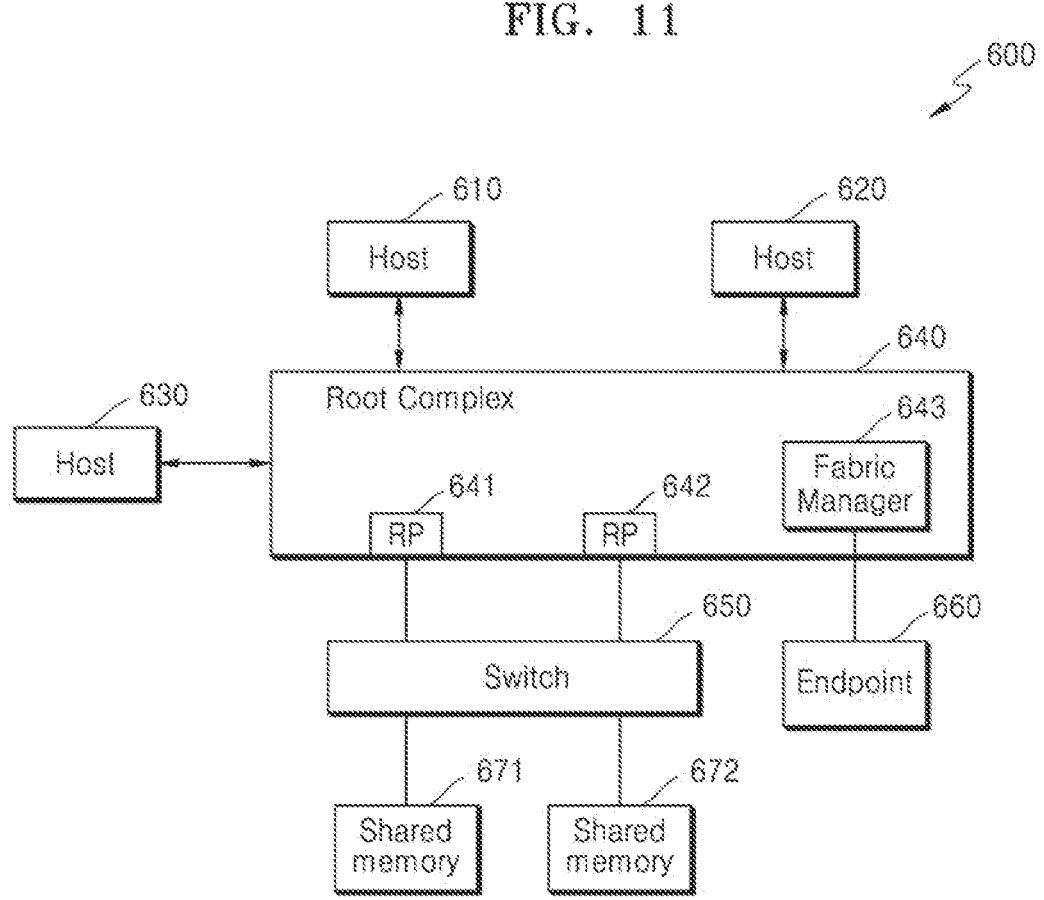
FIG. 11 is a block diagram illustrating an example of a system according to an example embodiment.

FIG. 11 is a block diagram illustrating an example of a system according to an example embodiment. A system 600 may include hosts 610 to 630 and a root complex 640. The root complex 640 may include one or more root ports (RP) 641 and 642 connected to shared memories 671 and 672. The root complex 640 may further include a fabric manager 643 that transmits data or requests through a fabric such as Ethernet, and may be connected to an endpoint 660 through the fabric. As an example, the endpoint 660 may include a flash-based memory such as SSD and UFS, a volatile memory such as DRAM and SDRAM, and a nonvolatile memory such as PRAM, MRAM, RRAM, and FRAM. In FIG. 11, the root complex 640 is shown to be a separate component from the hosts 610 to 630, but the root complex 640 may be implemented in a form integrated into each of the hosts 610 to 630.

The root complex 640 may provide data communication between the hosts 610 to 630 and the shared memories 671 and 672 based on various types of protocols, and may support a CXL protocol. In an example embodiment, the root complex 640 and the shared memories 671 and 672 may perform an interface including various protocols defined by the CXL specification, such as an I/O protocol (CXL.io).

Each of the shared memories 671 and 672 may correspond to a Type 3 device defined in the CXL specification, and accordingly, each of the shared memories 671 and 672 may include a memory expander. According to an example embodiment, the memory expander may include a controller. For example, the shared memory 530 of FIG. 10 may be the memory expander.

According to an example embodiment, the system 600 may include a switch 650 that supports multiple virtual channels. The virtual channel may provide a plurality of delivery paths logically divided within one physical interface.

One root port may be connected to a plurality of different devices through a virtual channel, or two or more root ports may be connected to one device. For example, a first root port 641, which is one of the one or more root ports 641 and 642, may be connected to at least one of the shared memories 671 and 672 through the switch 650, and the one or more root ports 641 and 642 may be connected in common to one of the shared memories 671 and 672 through the switch 650.

According to an example embodiment, each of the hosts 610 to 630 may access the shared memories 671 and 672 through the root complex 640 and the switch 650.

While example embodiments have been described with reference to the drawings, it will be understood that various changes in form and details may be made therein without departing from the spirit and scope of the following claims.

What is claimed is:

1. A storage system comprising:
   a storage device configured to store data in a storage area corresponding to a physical address;
   a buffer memory configured to temporarily store data read from the storage device; and
   a storage controller configured to:
   store first data having a first priority and second data having a second priority received by the storage system in the storage device,
   load the first data into the buffer memory, and
   provide a portion of the first data loaded into the buffer memory in response to a request caused by a failure of a container,
   wherein the buffer memory is directly coupled to the storage controller,
   wherein if the first data and the second data correspond to different image layers related to each other included in a image file creating the container, the first priority of the first data and the second priority of the second data is determined at least based on a position of a corresponding image layer in the image file.

2. The storage system of claim 1, wherein the storage controller is further configured to output the first data loaded in the buffer memory to outside of the storage system in response to a read request for the first data received by the storage system.

3. The storage system of claim 1, wherein the storage controller is further configured to, based on the storage system receiving an identifier indicating that the first data and the second data is a first type of file data, control the storage device so that each of the first data and the second data is stored in a storage area corresponding to continuous physical addresses.

4. The storage system of claim 3, wherein the storage controller is further configured to allocate to the first data and the second data the continuous physical addresses in a range determined based on size information of the first data and the second data received by the storage system.

5. The storage system of claim 3, wherein the storage controller is further configured to, based on the first data and the second data being a second type of file data, control the storage device so that each of the first data and the second data is stored in a storage area corresponding to discontinuous physical addresses.

6. The storage system of claim 3, wherein the identifier indicates that the first data and the second data are data corresponding to an image file that is used to create a virtual container and includes a plurality of image layers.

7. The storage system of claim 6, wherein the storage device includes a plurality of storage areas respectively connected to the storage controller through a plurality of channels, and
   the storage controller is further configured to control the storage device so that the plurality of image layers are stored in parallel in each of the plurality of storage areas, based on layer identifiers for classifying the plurality of image layers.

8. The storage system of claim 7, wherein the storage controller is further configured to receive layer information between the plurality of image layers from outside of the storage system, and based on a read request for a first image layer among the plurality of image layers being received by the storage system, preload a second image layer located in a lower layer of the first image layer from the storage device to the buffer memory.

9. The storage system of claim 1, wherein the first priority and the second priority are determined based on a number of times the first data and the second data are accessed.

10. The storage system of claim 1, wherein the storage device includes a first storage area and a second storage area, and
    the storage controller is further configured to allocate an access request received from an first external host to the first storage area, and allocate an access request received from a second external host to the second storage area.

11. A method of operating a computing system including a host and a storage system, the method comprising:
    obtaining, by the host, a first image file from an external registry;
    creating, by the host, a container by executing the first image file;
    providing, by the host, the first image file and metadata including an identifier indicating that the first image file is an image file to the storage system, the metadata further including priority information of image layers related to each other included in the first image file having been determined at least based on a position of a corresponding image layer;
    storing, by the storage system, the first image file in a first storage area corresponding to first continuous physical addresses, based on the identifier; and
    providing, by the storage system to the host, a portion of the first image file from a buffer memory of the storage system, in response to a request caused by a failure of the container executing the first image file, wherein the buffer memory is directly coupled to a storage controller of the storage system and is configured to temporarily store data read from the first storage area.

12. The method of claim 11, wherein the metadata further includes a priority of the first image file, and
the storing of the first image file in the first storage area includes loading the first image file from the first storage area into the buffer memory based on whether the priority of the first image file is higher than a preset value.

13. The method of claim 12, further comprising:
storing, by the storage system, a second image file received from the host in a second storage area corresponding to second continuous physical addresses;
requesting, by the host, the storage system to read the first image file;
transferring, by the storage system, the first image file stored in the buffer memory to the host;
requesting, by the host, the storage system to read the second image file; and
transferring, by the storage system, the second image file stored in the second storage area to the host,
wherein a time required for the host to receive the first image file after the requesting the storage system to read the first image file is shorter than a time required for the host to receive the second image file after the requesting the storage system to read the second image file.

14. The method of claim 11, wherein the metadata further includes priorities of a plurality of layer images included in the first image file, and
the storing of the first image file in the first storage area includes loading a first layer image having a higher priority than a preset value among the plurality of layer images from the first storage area to the buffer memory.

15. The method of claim 14, wherein the metadata includes layer information between the plurality of layer images, and the method further comprises:
requesting, by the host, the storage system to read the first layer image;
providing, by the storage system, the first layer image loaded in the buffer memory to the host; and
loading, by the storage system, a second layer image located in a lower layer of the first layer image among the plurality of layer images into the buffer memory, based on the layer information.

16. A computing system comprising:
a host configured to generate a container by executing an image file obtained from an external registry, and output a first request for storing the image file and metadata including an identifier of the image file; and
a storage system configured to:
receive the first request for storing the image file and the metadata, the metadata including priority information of image layers related to each other included in the image file having been determined at least based on a position of a corresponding image layer,
store the image file in a sequential manner by allocating the image file to continuous physical addresses based on the identifier, and
provide, to the host, a portion of the image file from a buffer memory of the storage system, in response to a second request caused by a failure of the container executing the image file, wherein the buffer memory is directly coupled to a storage controller of the storage system and is configured to temporarily store data read from the storage system.

17. The computing system of claim 16, wherein the storage system comprises:
a storage device including a storage area corresponding to the continuous physical addresses,
wherein the storage controller is configured to load the image file stored in the storage device into the buffer memory based on information on a priority of the image file included in the metadata, and
wherein the buffer memory is configured to temporarily store data read from the storage device.

18. The computing system of claim 17, wherein the storage system is further configured to, in response to a read request for the image file is received from the host, transmit the image file loaded in the buffer memory to the host.

19. The computing system of claim 17, wherein the host is further configured to determine the priority of the image file based on a number of times the container is executed.

20. The storage system of claim 1, wherein the buffer memory is further configured to provide data to the storage controller faster than the storage device.

* * * * *